US005218765A

United States Patent [19]

Huang

[11] Patent Number: 5,218,765

[45] Date of Patent: Jun. 15, 1993

[54] PIPE CUTTER

[76] Inventor: Chi C. Huang, No. 9, Feng Sheh Rd., Ta Sheh Village, Shen Kang Hsiang, Taichung Hsien, Taiwan

[21] Appl. No.: 976,948

[22] Filed: Nov. 17, 1992

[51] Int. Cl.[5] .......... B23D 21/06; B23D 3/16

[52] U.S. Cl. .......... 30/92; 30/241

[58] Field of Search .......... 30/92, 241, 113, 182, 30/208, 272.1

[56] References Cited

U.S. PATENT DOCUMENTS 2,763,926 9/1956 Pate .......... 30/241
5,018,275 5/1991 Huang .......... 30/92
5,046,250 9/1991 Huang .......... 30/92

*Primary Examiner*—Frank T. Yost
*Assistant Examiner*—Hwei-Siu Payer
*Attorney, Agent, or Firm*—Hedman, Gibson & Costigan

[57] ABSTRACT

A pipe cutter includes a slide slidably engaged in the housing of the pipe cutter, a shaft rotatably supported in the housing, a handle having an upper portion fixed to the shaft, a gear wheel engaged on the shaft and engaged with the slide, and a ratchet gearing engaged between the shaft and the gear wheel for driving the gear wheel to rotate in an active direction. The gear wheel can be prevented from rotating in a reverse direction by a pawl.

6 Claims, 5 Drawing Sheets

PIPE CUTTER

BACKGROUND OF THE INVENTION

1. Field of the Invention

The present invention relates to a cutter, and more particularly to a pipe cutter.

2. Description of the Prior Art

The closest prior art of which applicant is aware is his prior U.S. Patent No. 5,046,250 to Huang, filed Nov. 8, 1990, entitled "PIPE CUTTING DEVICE". In this patent, an arm is required to be depressed manually such that the cutting element can be retracted.

The present invention has arisen to mitigate and/or obviate the afore-described disadvantages of the conventional pipe cutters.

SUMMARY OF THE INVENTION

The primary objective of the present invention is to provide a pipe cutter in which the cutting element may be retracted automatically.

In accordance with one aspect of the invention, there is provided a pipe cutter comprising a body including a channel formed therein, a mouth formed in a front portion thereof for receiving a pipe to be cut, and a grip member extended downward therefrom; a slide slidably engaged in the channel and including a cutting blade provided in a front portion thereof and movable toward the pipe for cutting the pipe, and a rack formed in a lower portion thereof; a shaft rotatably supported in the body; a gear wheel engaged on the shaft and engaged with the rack of the slide; a ratchet gearing engaged between the shaft and the gear wheel for driving the gear wheel when the shaft rotates; and a handle including an upper portion fixed to the shaft in order to rotate the shaft when the handle is pulled toward the grip member and moved away from the grip member; whereby, the slide and the cutting blade are caused to move forward toward the mouth by the engagement between the rack of the slide and the gear wheel when the gear wheel is rotated by the shaft and when the handle is pulled in a repeated action.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
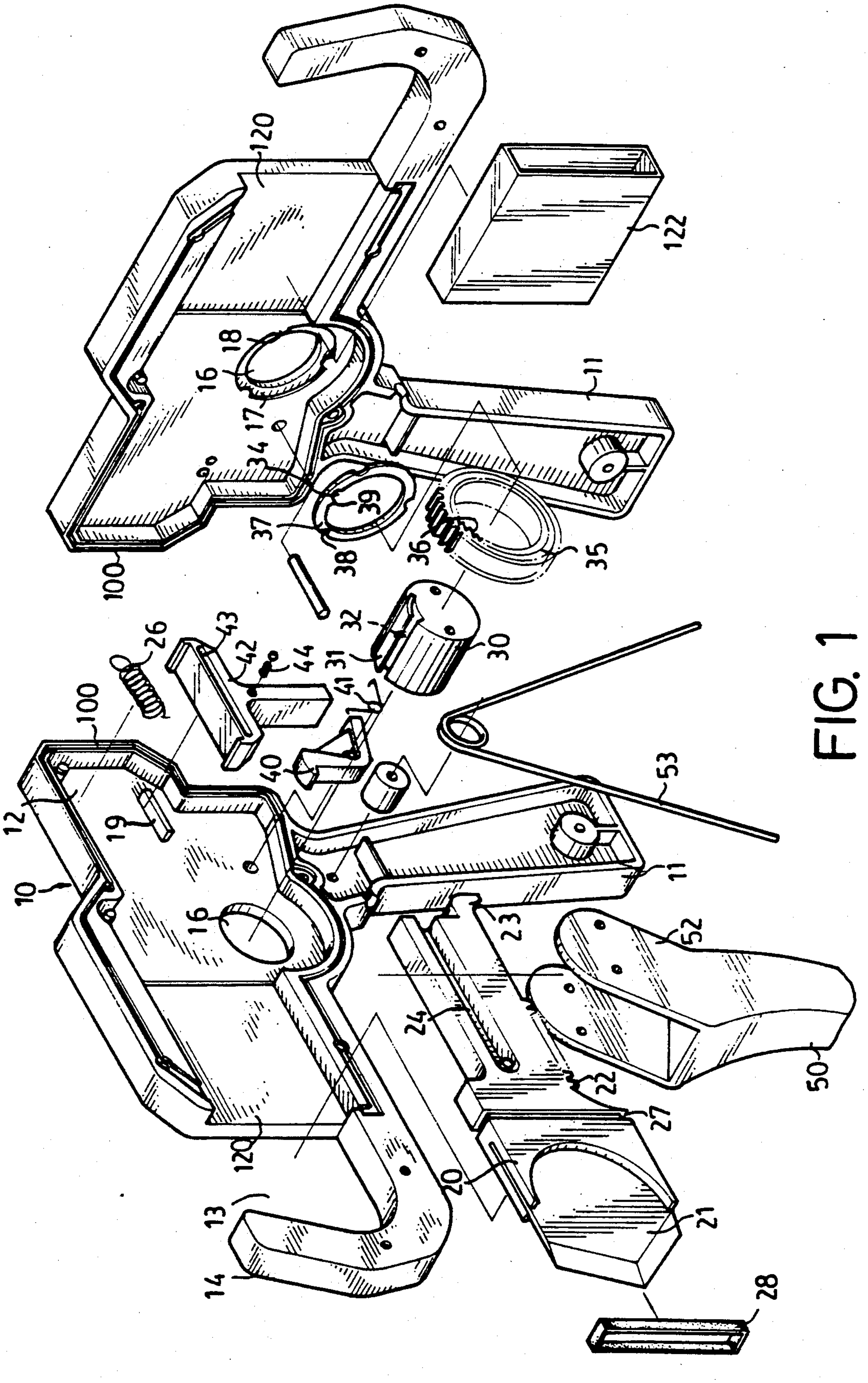
FIG. 1 is an exploded view of a pipe cutter in accordance with the present invention.
Figure 2:
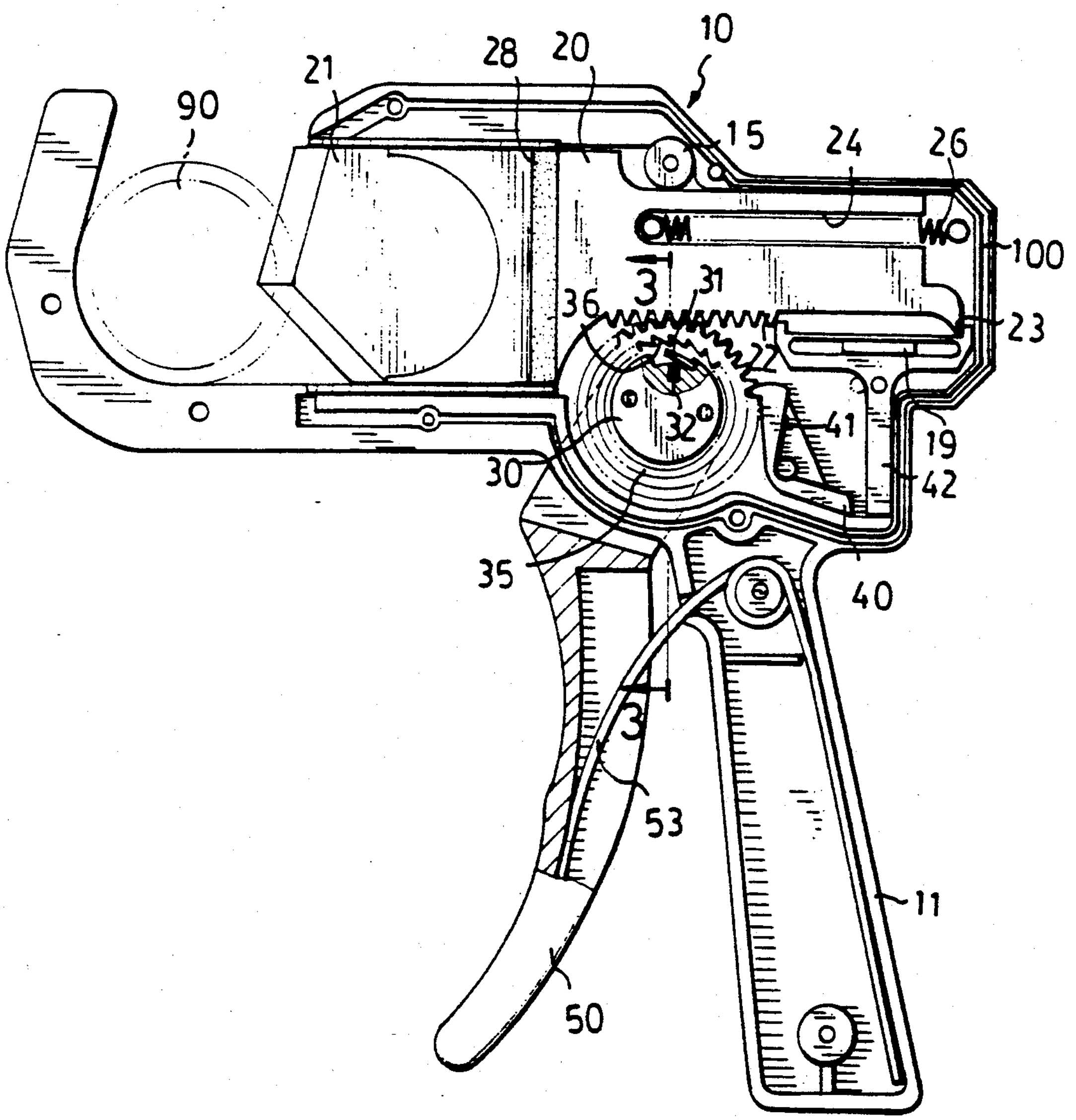
FIG. 2 is a cross sectional view of the pipe cutter.
Figure 3:
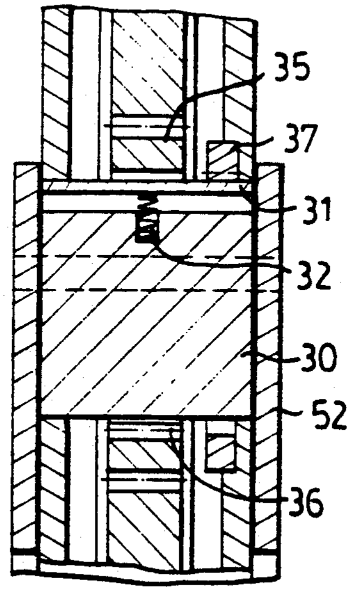
FIG. 3 is a partial cross sectional view of the pipe cutter, taken along lines 3—3 of FIG. 2.

Referring to the drawings, and initially to FIGS. 1, 2, and 3, a pipe cutter in accordance with the present invention comprises generally a two-part body 10 including a grip member 11 extended downward therefrom such that the body 10 is substantially gun-shaped, a channel 12 longitudinally formed in the body 10, a pair of depressions 120 oppositely formed in the body 10 and communicated with the channel 12, a casing 122 engaged in the depressions 120, a fixed jaw member 14 provided on the front end of the body 10, a mouth 13 formed in the body 10 close to the fixed jaw member 14 for receiving a pipe 90 to be cut, a handle 50 pivotally provided in front of the grip member 11, a roller 15 rotatably disposed in the upper portion of the body 10, a pair of openings 16 oppositely formed in the body 10, i.e., an opening 16 formed in each part of the body 10, and a shoulder 17 formed in one of the openings 16. Three protrusions 18 are formed in the shoulder 17 and extended radially inwards of the shoulder 17. A rib 19 is formed in the rear portion of the body 10.

A slide 20 is slidably engaged in the casing 122 and slidable longitudinally along the channel 12 of the body 10, a triangularly shaped cutting blade 21 provided in the front portion of the slide 20 and movable toward the pipe 90 for cutting the pipe 90, a rack 22 formed in the rear and lower portion of the slide 20, a hook 23 formed in the rear end portion of the rack 22, and a cavity 24 formed in the rear portion of the slide 20. A spring 26 is received in the cavity 24 and coupled between the slide 20 and the body 10 such that the slide 20 can be biased backward by the spring 26. It is to be noted that an annular slot 27 is formed in the middle portion of the slide 20 for engagement with a sealing ring 28 which bears against the inner surface of the casing 122 so as to form a water tight seal; and a groove 100 is formed along the perimeter of the body 10 for receiving a sealing material so as to form a water tight seal; whereby, the body 10 is well sealed such that water and dust are prevented from entering into the body 10.

A shaft 30 is engaged in the openings 16 of the body 10 and includes a catch 31 laterally provided in the radially outward portion thereof, a spring 32 is biased between the shaft 30 and the catch 31 for biasing the catch 31 radially outward of the shaft 30. A gear wheel 35 is engaged on the shaft 30 and engaged with the rack 22 of the slide 20 such that the slide 20 can be caused to move forward when the gear wheel 35 rotates. The gear wheel 35 includes an internal gear 36, such as a ratchet gear, formed therein for engagement with the catch 31 of the shaft 30 and arranged such that the gear wheel 35 can be rotated in an active direction when the shaft 30 rotates. The catch 31 and the internal gear 36 form a ratchet gearing. A ring 37 is engaged in the shoulder 17 of the body 10 and includes three notches 38 formed in the outer peripheral portion thereof for engagement with the protrusions 18 such that the rotation movement of the ring 37 is prohibited, the ring 37 includes a recess 34 formed in the inner portion thereof for accommodating the catch 31 of the shaft 30 and a projection 39 formed beside the recess 34 for engagement with the catch 31.

A pawl 40 is rotatably disposed in the body, a spring 41 is provided for biasing the pawl 40 to engage with the gear wheel 35 such that the gear wheel 35 is prevented from rotating in a reverse direction. It is to be noted that the gear wheel 35 is rotatable in the active direction when the pawl 40 is engaged with the gear wheel 35. A follower 42 includes an oblong hole 43 formed therein for sliding engagement with the rib 19 of the body 10 so that the follower 42 is slidable along the rib 19, a protrusion 44 including a spring and a ball is engaged in the follower 42 for positioning the follower 42. The handle 50 includes a pair of lugs 52 extended upward therefrom and fixed to the shaft 30 so that the shaft 30 can be caused to rotate when the handle 50 is pulled and released relative to the grip member 11 of the body 10. A spring 53 is biased between the handle 5 and the grip member 11 so as to bias the handle 50 away from the grip member 11.

Figure 4:
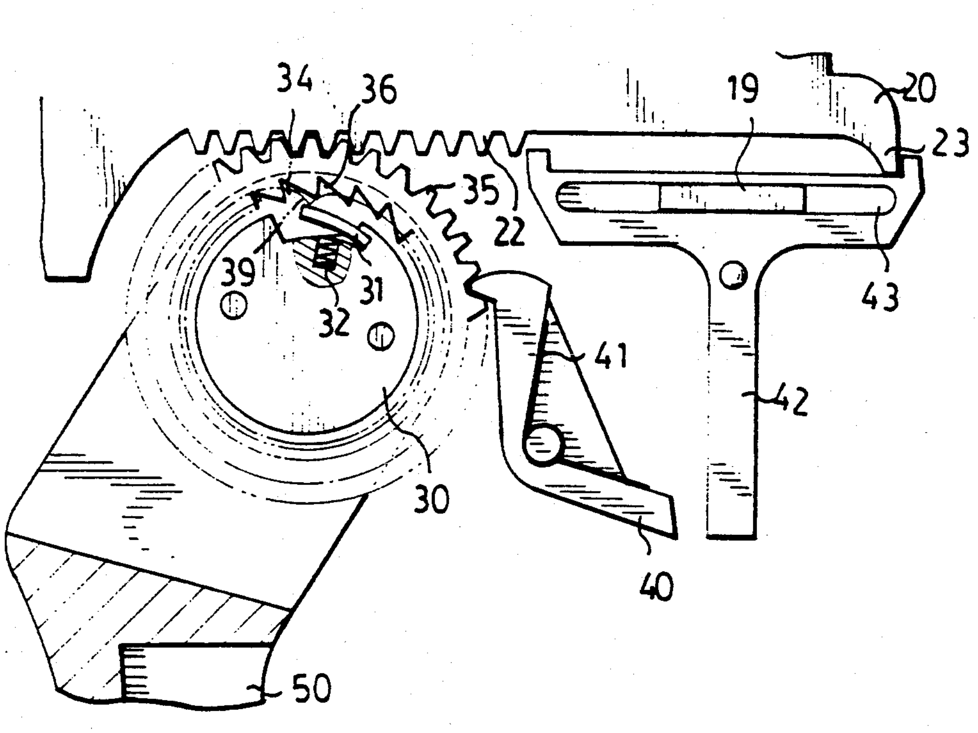
FIGS. 4 and 5 are enlarged partial cross sectional view of the pipe cutter, illustrating the operations of the pipe cutter.
Figure 5:
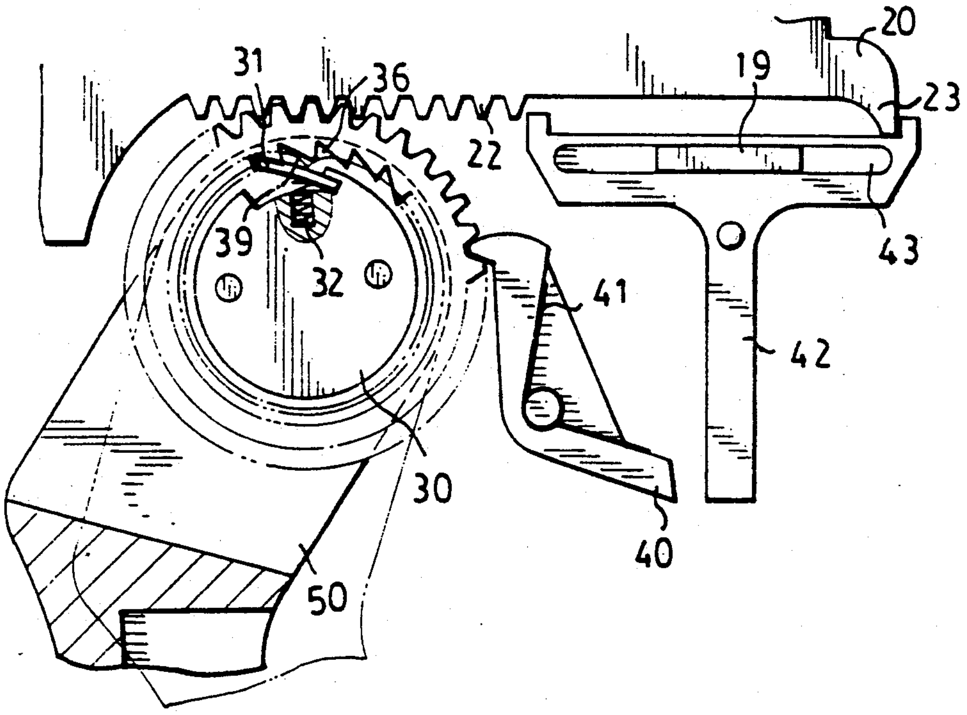

In operation, referring next to FIG. 4 first, the catch 31 is depressed radially inwards by the projection 39 of the ring 37 such that the catch 31 will not engage with the internal gear 36 of the gear wheel 35. Referring next to FIG. 5, when the handle 50 is pulled toward the grip member 11, the shaft 30 is caused to rotate counterclockwise, the catch 31 is then moved relative to the projection 39 and is biased radially outwards toward the recess 34 by the spring 32 such that the catch 31 can be caused to engage with the internal gear 36 of the gear wheel 35, whereby, the gear wheel 35 can be caused to rotate in the active direction, i.e., counterclockwise as seen from FIG. 5, by the catch 31 of the shaft 30, and the slide 20 and the cutting blade 21 can thus be caused to move forward to cut the pipe 90 when the handle 50 is pulled in a repeated action.

Figure 6:
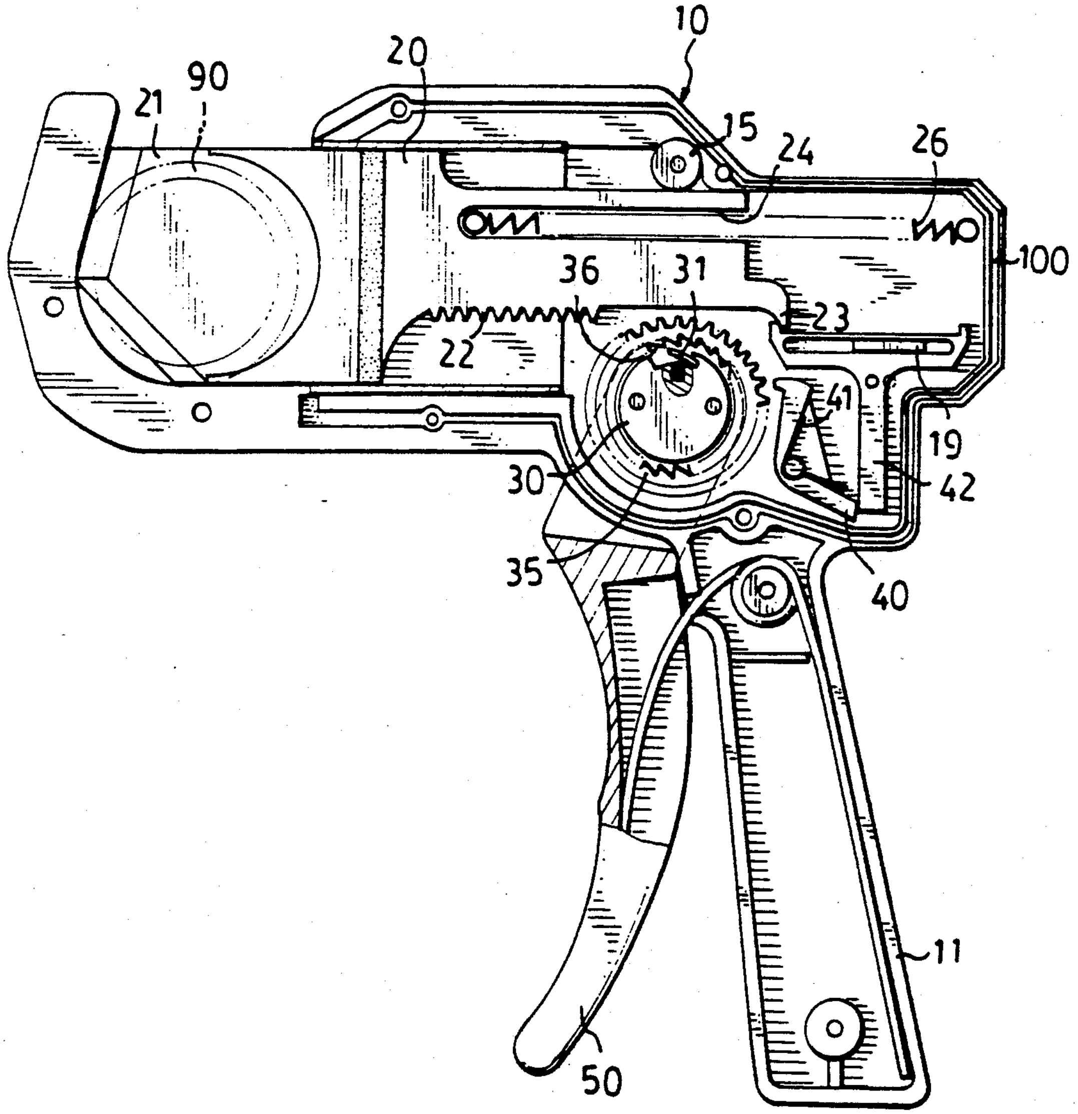
FIG. 6 is a cross sectional view similar to FIG. 2, illustrating the operations of the pipe cutter.

Referring next to FIG. 6, when the slide 20 is moved to the forward most position, the follower 42 is caused to move forward by the hook 23 of the slide 20, and the lower portion of the pawl 40 is actuated by the follower 42 such that the upper portion of the pawl 40 is disengaged from the gear wheel 35, at this moment, the gear wheel 35 is rotatable in the reverse direction, i.e. the clockwise direction. It is to be noted that the handle 50 should be released, such that the catch 31 is depressed radially inwards by the projection 39 of the ring 37 and such that the catch 31 is disengaged from the internal gear 36 of the gear wheel 35, whereby, the gear wheel 35 is freely rotatable in the reverse direction.

Accordingly, the pipe cutter in accordance with the present invention includes an automatically reversible cutting blade. In addition, the pipe cutter is well sealed such that dust and water will not enter into the body of the pipe cutter during plumbing operations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe cutter comprising:

a body including a channel formed therein, a mouth formed in a front portion thereof for receiving a pipe to be cut, and a grip member extended downward therefrom;

a slide slidably engaged in said channel and including a cutting blade provided in a front portion thereof and movable toward said pipe for cutting said pipe, and a rack formed in a lower portion thereof;

a shaft rotatably supported in said body;

a gear wheel engaged on said shaft and engaged with said rack of said slide;

a ratchet gearing engaged between said shaft and said gear wheel for driving said gear wheel when said shaft rotates; and a handle including an upper portion fixed to said shaft and movable toward said grip member in order to rotate said shaft when said handle is pulled toward said grip member and moved away from said grip member;

whereby, said slide and said cutting blade are caused to move forward toward said mouth by the engagement between said rack of said slide and said gear wheel when said gear wheel is rotated by said shaft and when said handle is pulled in a repeated action.

2. A pipe cutter according to claim 1, wherein said ratchet gearing includes an internal gear formed in said gear wheel, a catch laterally disposed on said shaft, and means for biasing said catch radially outwards of said shaft in order to engage with said internal gear of said gear wheel.

3. A pipe cutter according to claim 2 further comprising means for pulling said slide away from said mouth, a pawl pivotally supported in said body for engagement with said gear wheel, a follower slidably disposed in said body and movable toward said pawl for disengaging said pawl from said gear wheel, a hook formed in a lower and rear portion of said slide and engageable with said follower in order to cause said follower to move toward said pawl when said pipe is cut, and means for depressing said catch radially inwards in order to disengage said catch from said internal gear of said gear wheel, whereby, said slide is pulled away from said mouth by said pulling means when said pawl is disengaged from said gear wheel and when said catch is disengaged from said internal gear of said gear wheel.

4. A pipe cutter according to claim 3, wherein said body includes a rib formed therein, said follower includes an oblong hole formed therein and slidably engaged with said rib, whereby, said follower is guided to move along said rib.

5. A pipe cutter according to claim 3, wherein said depressing means includes a ring engaged on said shaft and fixed to said body, said ring includes a recess formed in an inner peripheral portion thereof for accommodating said catch when said catch is biased radially outwards of said shaft, and a projection formed beside said recess for depressing said catch radially inwards when said catch is engaged with said projection.

6. A pipe cutter according to claim 1, wherein said body includes a casing disposed in a middle portion thereof, said slide includes an annular slot formed in an outer peripheral port ion thereof for receiving a sealing ring in order to form a water tight seal between said slide and said casing.

* * * * *